United States Patent
Ishimaru et al.

(10) Patent No.: US 10,060,740 B2
(45) Date of Patent: *Aug. 28, 2018

(54) DISTANCE DETECTION DEVICE

(71) Applicant: DENSO CORPORATION, Kariya, Aichi-pref. (JP)

(72) Inventors: Kazuhisa Ishimaru, Nagoya (JP); Noriaki Shirai, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 266 days.

This patent is subject to a terminal disclaimer.

(21) Appl. No.: 14/947,941

(22) Filed: Nov. 20, 2015

(65) Prior Publication Data

US 2016/0146602 A1    May 26, 2016

(30) Foreign Application Priority Data

Nov. 26, 2014    (JP) .................. 2014-238714

(51) Int. Cl.
*G01C 3/08* (2006.01)
*H04N 13/02* (2006.01)
*G06T 7/593* (2017.01)

(52) U.S. Cl.
CPC .............. *G01C 3/085* (2013.01); *G06T 7/593* (2017.01); *H04N 13/0225* (2013.01); *H04N 13/0239* (2013.01); *G06T 2207/30261* (2013.01)

(58) Field of Classification Search
CPC .......... G01C 3/085; G06T 2207/30261; G06T 7/593; G06T 7/004; H04N 13/0225; H04N 13/0239

See application file for complete search history.

(56) References Cited

U.S. PATENT DOCUMENTS

| | | | |
|---|---|---|---|
| 2009/0304266 A1 | 12/2009 | Aoki et al. | |
| 2012/0163672 A1* | 6/2012 | McKinnon | G06T 7/0075 382/106 |
| 2015/0199817 A1 | 7/2015 | Ishimaru et al. | |

(Continued)

FOREIGN PATENT DOCUMENTS

| | | |
|---|---|---|
| JP | 2008-123141 A | 5/2008 |
| JP | 2014-020845 A | 2/2014 |

*Primary Examiner* — Behrooz Senfi
(74) *Attorney, Agent, or Firm* — Knobbe, Martens, Olson & Bear, LLP

(57) ABSTRACT

A distance detection device calculates a pixel cost, every reference pixel, based on a difference between reference pixel information in a reference image and comparative pixel information in a comparative image while switching the reference and comparative images. The device calculates a parallax cost, every reference pixel, representing a cost regarding a change-amount of the parallax as a coordinate difference between a reference pixel and a comparative pixel when the reference image is switched. The device calculates a combination of each reference pixel and a comparative pixel having a minimum total cost every reference pixel. The minimum total cost represents a sum of the pixel cost and the parallax cost. The device obtains a relationship of a corresponding point between each reference pixel and its corresponding comparative pixel, and calculates a distance to an object in each captured image based on the relationship of the corresponding point.

12 Claims, 12 Drawing Sheets

(56) References Cited

U.S. PATENT DOCUMENTS

2015/0269737 A1* 9/2015 Lam .................. H04N 13/0011
　　　　　　　　　　　　　　　　　　382/154
2016/0358325 A1* 12/2016 Ishimaru .............. G06K 9/4604

* cited by examiner

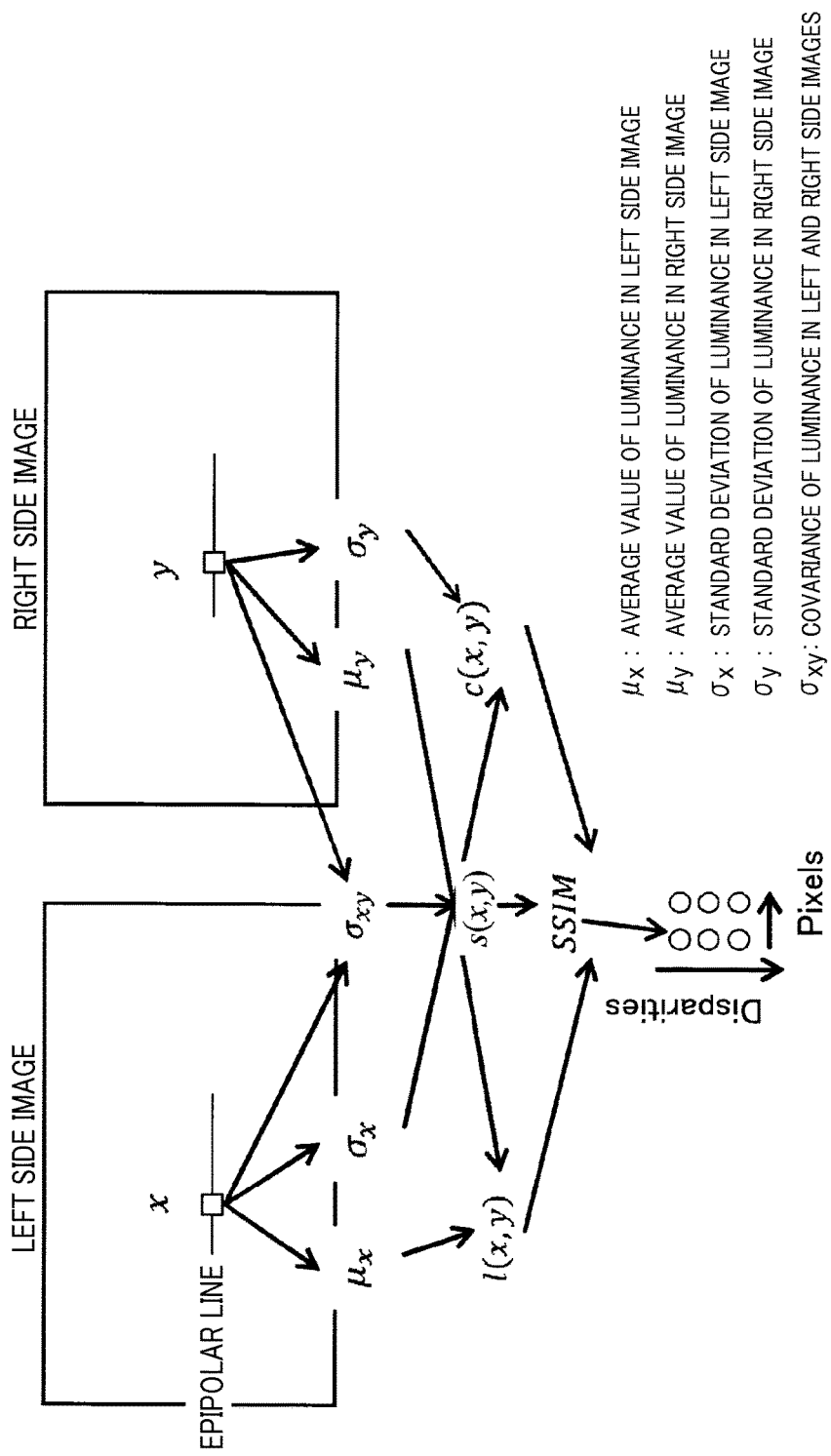

SCENE IMAGE

DISTANCE IMAGE

PARALLAX

HORIZONTAL POSITION

DISTANCE DETECTION DEVICE

CROSS-REFERENCE TO RELATED APPLICATION

This application is related to and claims priority from Japanese Patent Application No. 2014-238714 filed on Nov. 26, 2014, the contents of which are hereby incorporated by reference.

BACKGROUND OF THE INVENTION

1. Field of the Invention

The present invention relates to distance detection devices capable of detecting a distance to an object such as a preceding vehicle in a plurality of images captured by an image acquiring devices such as in-vehicle cameras.

2. Description of the Related Art

For example, a patent document, Japanese laid open publication No. JP 2014-020845 discloses a distance detection device. This distance detection device performs image processing of a plurality of images captured by a stereo camera, for example, mounted on an own vehicle. The distance detection device specifies an object as a detection target in the captured images, and performs a specific process of calculating a distance to the object such as a preceding vehicle from the own vehicle with high accuracy on the basis of the results of the image processing.

The distance detection device previously described usually performs the image processing using pattern matching on the basis of image data captured by in-vehicle cameras forming a stereo camera in order to specify a detection target. However, the distance detection device as a conventional technique previously described has a large processing load when performing the image processing with pattern matching.

SUMMARY

It is therefore desired to provide a distance detection device capable of correctly detecting a distance to an object as a detection target with a low processing load and simple processing on the basis of a plurality of images captured by cameras, for example, in-vehicle cameras forming a stereo camera.

An exemplary embodiment provides a distance detection device capable of detecting a distance to an object in a plurality of images captured by image capturing sections. The distance detection device has a pixel cost calculation section, a minimum cost pixel calculation section, a corresponding point setting section, an object extracting section, an image coordinate group acquiring section and a distance calculation section. The pixel cost calculation section calculates, for every reference pixel, a pixel cost on the basis of a difference between pixel information of a reference pixel in a reference image and pixel information of a comparative pixel in a comparative image while switching the reference image and the comparative image in the captured images of the image acquiring sections. The reference image is an image in a plurality of the captured images, and the comparative image is the images other than the reference image. The minimum cost pixel calculation section calculates, for every reference pixel, a parallax cost which represents a cost regarding a change amount of the parallax. This parallax represents a coordinate difference between a reference pixel in the reference image and a comparative pixel in the comparative image.

The minimum cost pixel calculation section calculates a minimum total cost for a combination of each reference pixel and each comparative pixel. The minimum total cost represents a sum of the pixel cost and the parallax cost.

The corresponding point setting section calculates a relationship of a corresponding point between each reference pixel and its corresponding comparative pixel in the comparative image.

The object extracting section extracts an object from each of the captured images on the basis of the relationship of the corresponding point between each reference pixel and its corresponding comparative point. The image coordinate group acquiring section calculates an image coordinate group which represents a coordinate of the object in each of the captured images forming a first captured image group and a second captured image group. The first captured image group has a plurality of the captured images obtained every reference period. The second captured image group has images obtained by shifting the reference period of the captured images by an asynchronous timing. The distance calculation section calculates a distance to the object in each of the image coordinate group on the basis of a relationship between the first captured image group and the second captured image group in which the first captured image group is shifted from the second captured image group by the asynchronous timing.

According to the distance detection device having the structure previously described, because the corresponding points are calculated on the basis of the cost calculation, it is possible for the distance detection device to detect and recognize an object such as a preceding vehicle by performing a simple process. This makes it possible to reduce the processing load necessary to calculate the distance to the object.

BRIEF DESCRIPTION OF THE DRAWINGS

A preferred, non-limiting embodiment of the present invention will be described by way of example with reference to the accompanying drawings, in which:

FIG. 5 is a schematic view explaining a structure similarity (SSIM) used by the distance detection device according to the exemplary embodiment of the present invention;

DETAILED DESCRIPTION OF THE PREFERRED EMBODIMENTS

Figure 1:
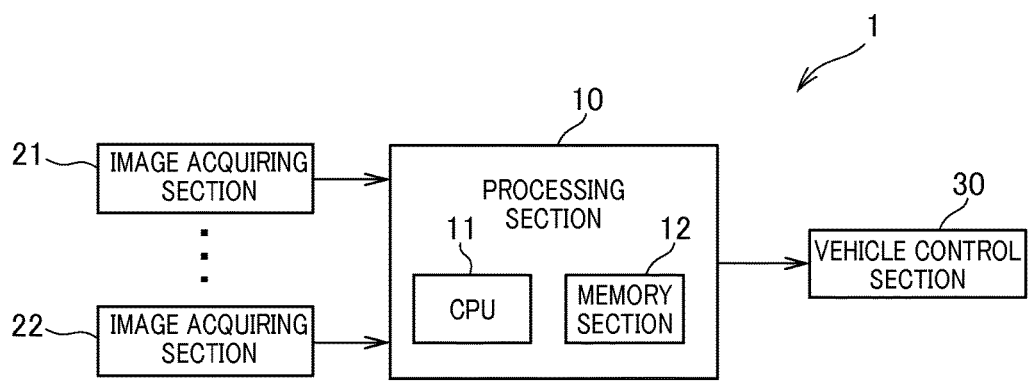
FIG. 1 is a schematic block diagram showing a structure of a distance detection device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of the distance detection device according to an exemplary embodiment.
[Structure of Distance Detection Device]
FIG. 1 is a schematic block diagram showing a structure of the distance detection device 1 according to the exemplary embodiment to which the concept of the present invention has been applied. The distance detection device 1 is capable of calculating a distance to each point, i.e. an object as a detection target, from the distance detection device 1 on the basis of detected parallax of captured images. In particular, the distance detection device 1 according to the exemplary embodiment calculates a correspondence relationship (i.e. parallax) between pixels in the captured images with high accuracy and a low processing load on the basis of the Viterbi algorithm as a dynamic programming (DP) applied to a plurality of directions. In addition, the distance detection device 1 according to the exemplary embodiment is capable of estimating a distance to an object as a target object to be detected such as a preceding vehicle with high accuracy and a low processing load on the basis of the asynchronous stereo method.

In more detail, the distance detection device 1 according to the exemplary embodiment is mounted on an own vehicle, etc. As shown in FIG. 1, the distance detection device 1 has a processing section 10, a plurality of image capturing sections 21 and 22, and a vehicle control section 30. It is also acceptable for the distance detection device 1 to have not less than three image capturing sections.

The image capturing sections 21 and 22 are known cameras, each of which is capable of capturing a scene image in front of the own vehicle in a forward direction to which the own vehicle drives. That is, the image capturing sections 21 and 22 are arranged parallel and separated from each other by a predetermined distance in a horizontal direction in order to form a stereo camera. These image capturing sections 21 and 22 capture scene images simultaneously and periodically with a predetermined time interval.

The processing section 10 consists of a central processing unit (CPU) 11, a memory section 12 having a read only memory (ROM), and a random access memory (RAM), etc. The processing section 10 (CPU 11) receives captured images transmitted from the image capturing sections 21 and 22. The processing section 10 performs various processes such as a distance calculation process, etc. on the basis of the programs stored in the memory section 12.

The vehicle control section 30 performs the control process of the own vehicle on the basis of the results processed by the processing section 10. For example, the vehicle control section 30 obtains distance information of each position (each pixel) in the scene images captured by the image capturing sections 21 and 22 and transmitted from the processing section 10. The vehicle control section 30 recognizes a position and relative speed of the object on the basis of the received distance information. When the recognition result indicates some kind of problem would occur, the vehicle control section 30 performs a process of switching a driving lane.
[Process of the Distance Detection Device 1 According to the Exemplary Embodiment]
FIG. 2 is a flow chart showing the distance calculation process performed by the processing section 10 (CPU 11) in the distance detection device 1 according to the exemplary embodiment.

Figure 2:
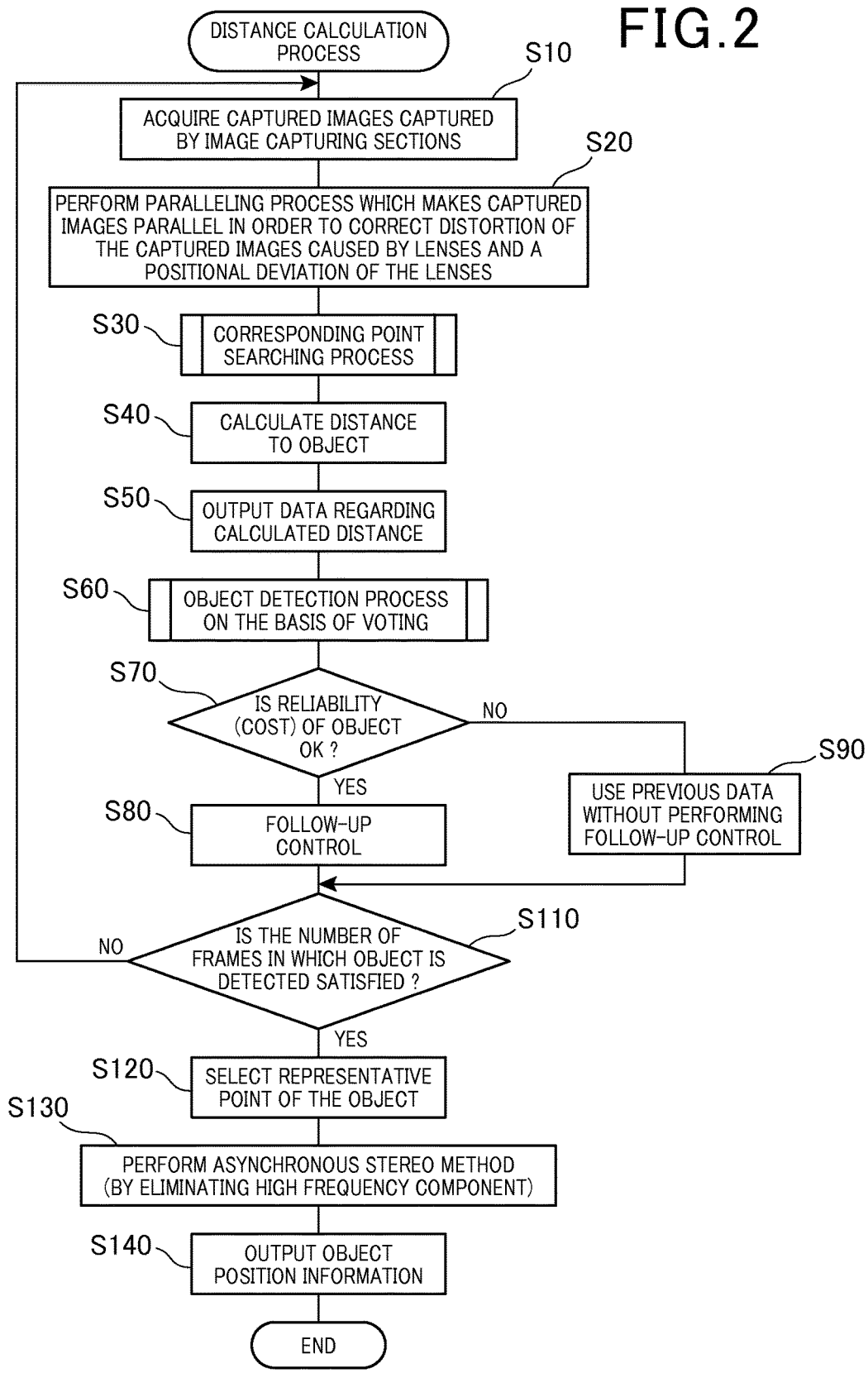
FIG. 2 is a flow chart showing a distance calculation process performed by a processing section (CPU) as the distance detection device according to the exemplary embodiment of the present invention.

The processing section 10 (CPU 11) performs the distance calculation process shown in FIG. 2 and other drawings. The distance calculation process calculates a distance to each position in the captured image. When the driver of the own vehicle turns on an electric power switch of the distance detection device 1, the distance detection device 1 starts to perform the distance calculation process every predetermined time period.

In the distance calculation process, the processing section 10 receives images captured by the image capturing sections 21 and 22 (step S10). The operation flow proceeds to step S20.

In step S20, the processing section 10 performs a paralleling process of making the captured images parallel. This paralleling process corrects distortion of the captured images caused by lenses, and a positional deviation of the lenses. The operation flow proceeds to step S30.

In step S30, the processing section 10 performs a corresponding point searching process. This corresponding point searching process provides a corresponding relationship between pixels in a reference image and pixels in a comparative image. For example, the reference image is acquired by the image capturing section 21, and the comparative image is acquired by the image capturing section 22, for example. In more detail, the corresponding point searching process generates a corresponding relationship between the pixels in two images which indicate the same object in the scene images captured by the different image capturing sections.

Figure 3:
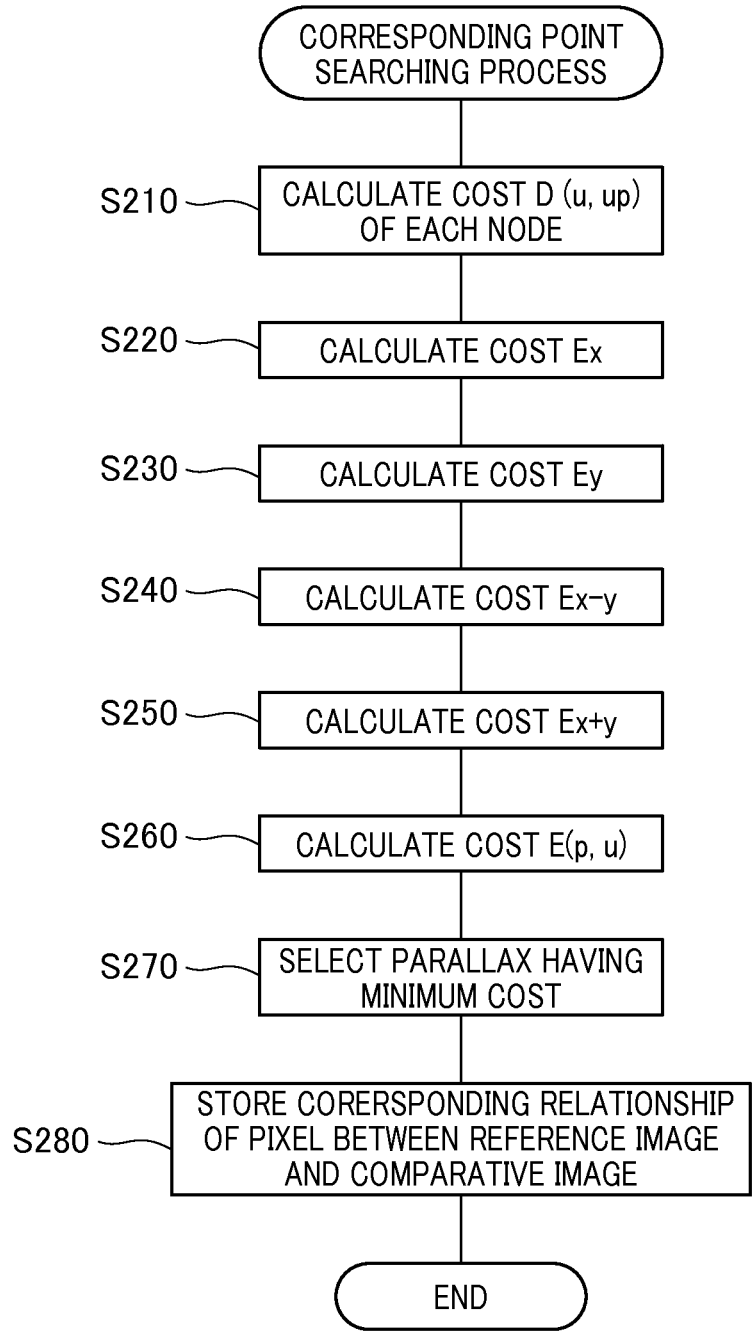
FIG. 3 is a flow chart showing a corresponding point searching process in the distance calculation process performed by the distance detection device according to the exemplary embodiment of the present invention.
Figure 4A:
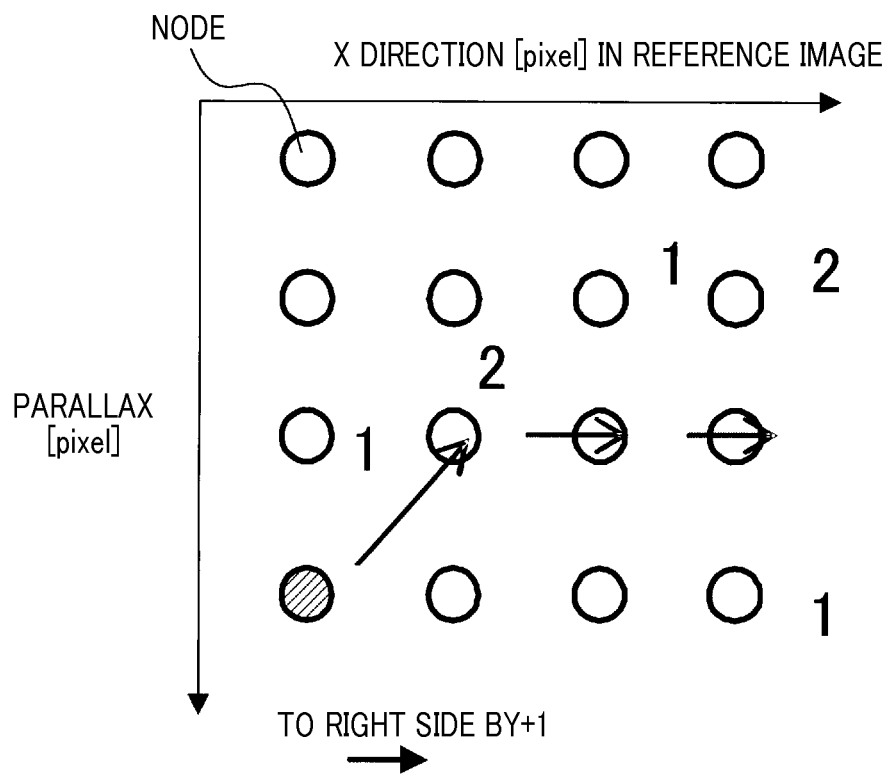
FIG. 4A and FIG. 4B are views explaining a cost calculation process in a horizontal direction (rightward direction and leftward direction) in a captured image.
Figure 4B:
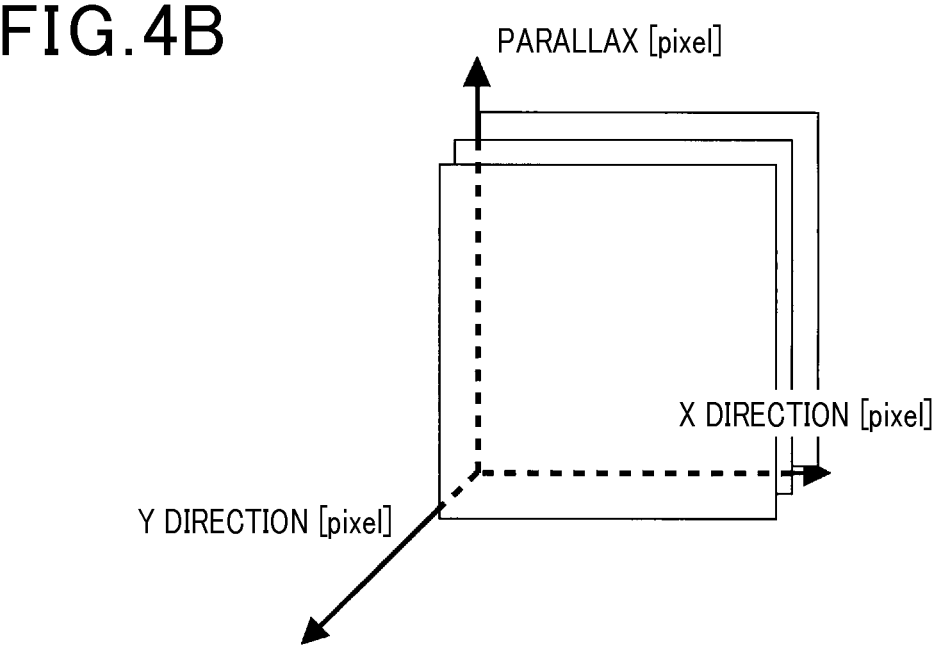

FIG. 3 is a flow chart showing the corresponding point searching process in the distance calculation process performed by the distance detection device 1 according to the exemplary embodiment. FIG. 4A and FIG. 4B are views explaining a cost calculation process in a horizontal direction (rightward direction and leftward direction) in the captured images.

In step S210 in the corresponding point searching process shown in FIG. 3, the processing section 10 calculates a cost of each node. As shown in FIG. 4A, each node corresponds to an element of a matrix. The horizontal axis of the matrix indicates a pixel position in the reference image. The vertical axis of the matrix indicates a parallax, i.e. the corresponding relationship between the pixel position in the reference image and the pixel position in the comparative image.

In the cost calculation process, the processing section 10 calculates a cost of each pixel in the comparative image within a parallax searching range every pixel in the reference image.

For example, a cost of a node is indicated by D(p, up), where p indicates a pixel position, and up indicates a parallax. The cost D(p, up) of a node can be calculated by using the following equation (1) regarding SSIM (structure Similarity). The function SSIM(x, y) will be explained later.

$$SSIM(x, y) = [l(x, y)]^{\alpha} [c(x, y)]^{\beta} [s(x, y)]^{\gamma} \quad (1)$$

$$l(x, y) = \frac{2\mu_x \mu_y + C_1}{\mu_x^2 + \mu_y^2 + C_1}, \text{ measure the luminance difference}$$

$$c(x, y) = \frac{2\sigma_x \sigma_y + C_2}{\sigma_x^2 + \sigma_y^2 + C_2}, \text{ measure the contrast difference}$$

$$s(x, y) = \frac{\sigma_{xy} + C_3}{\sigma_x \sigma_y + C_3}, \text{ measure the structure difference.}$$

In the equation (1) regarding the function SSIM, and α, β, and γ are optional constant values.

FIG. 5 is a schematic view explaining the structure similarity (SSIM) used by the distance detection device 1 according to the exemplary embodiment. The operation flow proceeds to step S220.

Next, the processing section 10 calculates a cost of each node in step S220 to step S260 on the basis of the Viterbi algorithm.

In the process of step S220, a cost Ex of the node is calculated by the following procedure.

[Procedure 1-1]

Each of the pixels in the reference image is sequentially selected from an upper left side to a rightward direction (or horizontal direction) in each row, i.e. from the uppermost row to the bottom row. At this time, each of the pixels in the row in the comparative image, which is the same row (at the same position in the vertical direction) currently selected in the reference image, is sequentially selected from the left side to the right side in each row. That is, as shown in FIG. 4B, the coordinate of each node to be selected is sequentially shifted in the horizontal direction (X direction) in the reference image and the comparative image, respectively.

The processing section 10 obtains a parallax cost S(up, uq) of each pixel in the comparative image by using a predetermined function. This predetermined function has been determined so that the cost is increased according to increasing of a magnitude of the parallax. This parallax indicates a difference in position between a pixel in the reference image and its corresponding pixel in the comparative image. S(up, uq) indicates a parallax cost when the parallax is changed from the position p to the position q.

[Procedure 1-2]

The processing section 10 processes the cost D(p, up) of each node and the parallax cost S(up, uq) on the basis of the Viterbi algorithm. The following equation relates to the Viterbi algorithm.

$$\text{Viterbi:} \quad (2)$$

$$E(u_p) = \sum_p D(p, u_p) + \sum_{(p,q) \in \varepsilon} s(u_p, u_q)$$

$$= \sum_p D(p, u_p) + \sum_{(p,q) \in \varepsilon} |u_p - u_q|$$

$$= \sum_p D(p, u_p) + \sum |\nabla u|.$$

The equation (2) which uses the Viterbi algorithm shows a sum of the cost D(p, up) of each node and the parallax cost S(up, uq) from the node at the left side to the node in the matrix indicated by the arrows shown in FIG. 4A.

The processing section 10 obtains a combination of the cost of the node and the parallax cost every each node so that the sum E(up) has a minimum cost on the basis of the Viterbi algorithm. The obtained data become the cost in the rightward direction.

[Procedure 1-3]

The processing section 10 performs the same [Procedure 1-1] and [Procedure 1-2] previously described in order to obtain a cost of each node in the leftward direction from the right side to the left side on the basis of the Viterbi algorithm. The obtained data become the cost in the leftward direction.

[Procedure 1-4]

The processing section 10 adds the cost in the rightward direction obtained by the Procedure [1-2] and the cost in the leftward direction every corresponding node, and stores the addition result as the cost Ex in the horizontal direction into the memory section 12. The operation flow proceeds to step S230.

In step S230, the processing section 10 performs the following [Procedure 2-1] in order to obtain the cost Ey.

Figure 6A:
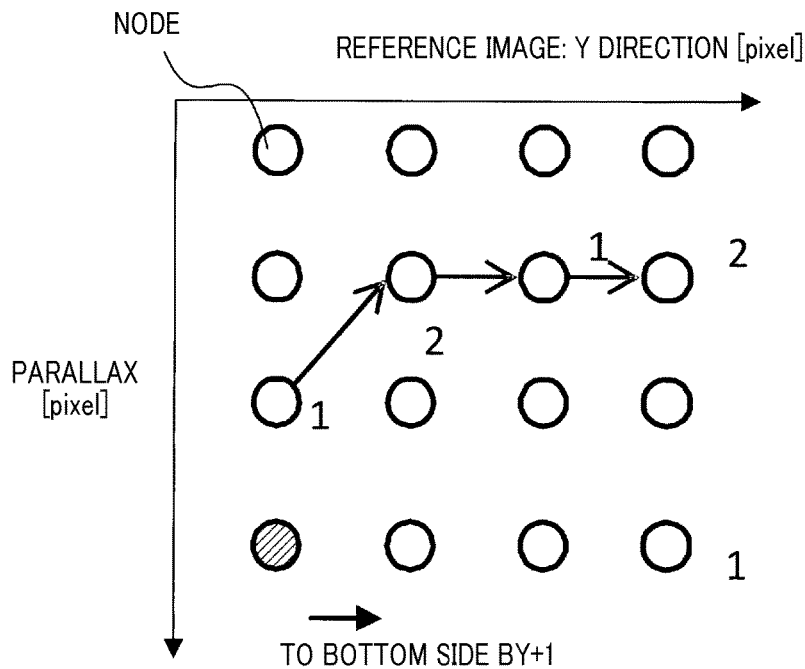
FIG. 6A and FIG. 6B are views explaining a cost calculation process in a vertical direction (upward direction and downward direction) in a captured image performed by the distance detection device according to the exemplary embodiment of the present invention.
Figure 6B:
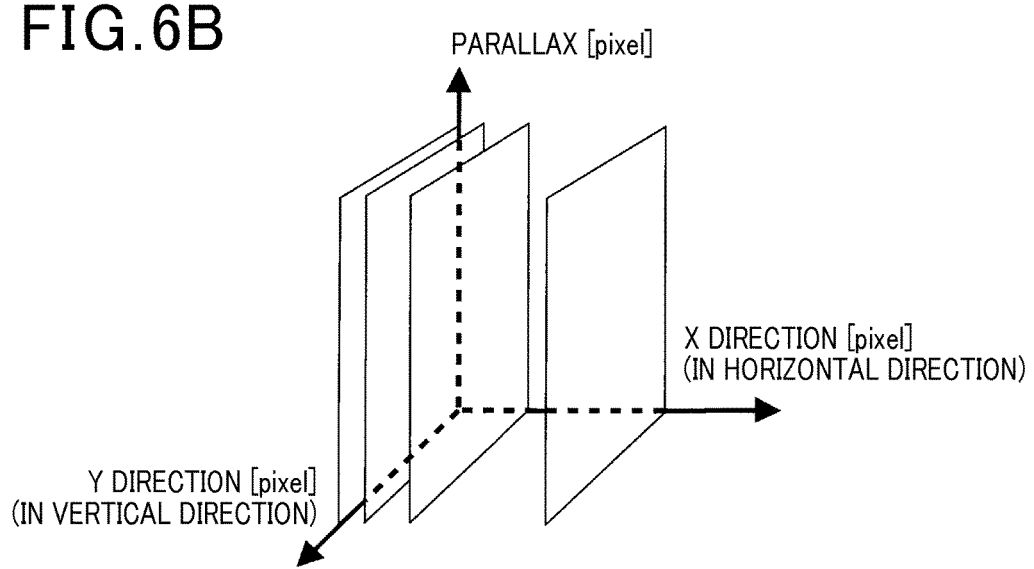

FIG. 6A and FIG. 6B are views explaining the cost calculation process in the vertical direction (upward direction and downward direction) in the captured image performed by the distance detection device 1 according to the exemplary embodiment.

[Procedure 2-1]

As shown in FIG. 6A, the processing section 10 prepares a virtual space viewed along the Y direction (in the Vertical direction in the captured image) having the nodes. The processing section 10 selects each pixel corresponding to each node. That is, the processing section 10 selects the pixels from the upper left side at the left-side column to the bottom direction in the reference image, and then selects the pixels at the upper side in the next right-side column in the reference image.

The processing section 10 repeatedly selects the pixels in the reference image until the final pixel at the bottom position in the right-side column. At this time, the processing section 10 selects the pixels in the comparative image corresponding, at the left-right position (the position in the horizontal direction), to the selected pixel in the reference image.

The processing section 10 obtains the parallax cost S(up, uq) every node.
[Procedure 2-2]
The processing section 10 applies the Viterbi algorithm to the cost D(p, up) of each node and the parallax cost S(up, uq).

As shown in FIG. 6A, the processing section 10 obtains a combination of the cost of the node and the parallax cost every node, where the sum E(u,p) has the minimum cost on the basis of the Viterbi algorithm. The obtained data become the cost in the downward direction.
[Procedure 2-3]
The processing section 10 performs the same [Procedure 2-1] and [Procedure 2-2] previously described in order to obtain a cost of each node in the upward direction from the bottom side to the upper side on the basis of the Viterbi algorithm. The obtained data become the cost in the upward direction.
[Procedure 2-4]
The processing section 10 adds the cost in the downward direction obtained by the [Procedure 2-2] and the cost in the upward direction obtained by the [Procedure 2-3] every corresponding node, and stores the addition result as the cost Ey in the vertical direction into the memory section 12. The operation flow proceeds to step S240.

Figure 7A:
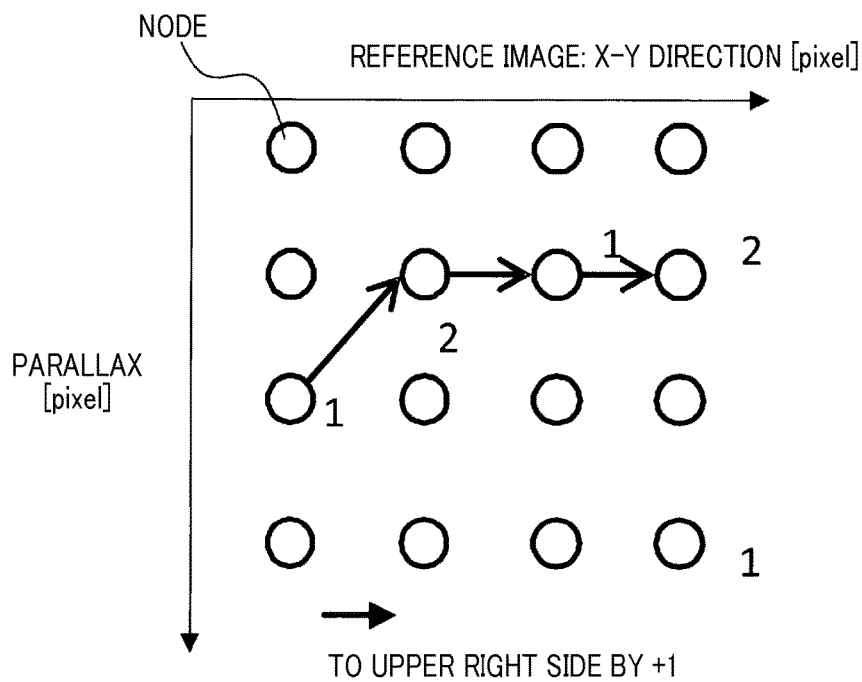
FIG. 7A and FIG. 7B are views explaining a cost calculation process in an oblique direction in a captured image performed by the distance detection device according to the exemplary embodiment of the present invention.
Figure 7B:
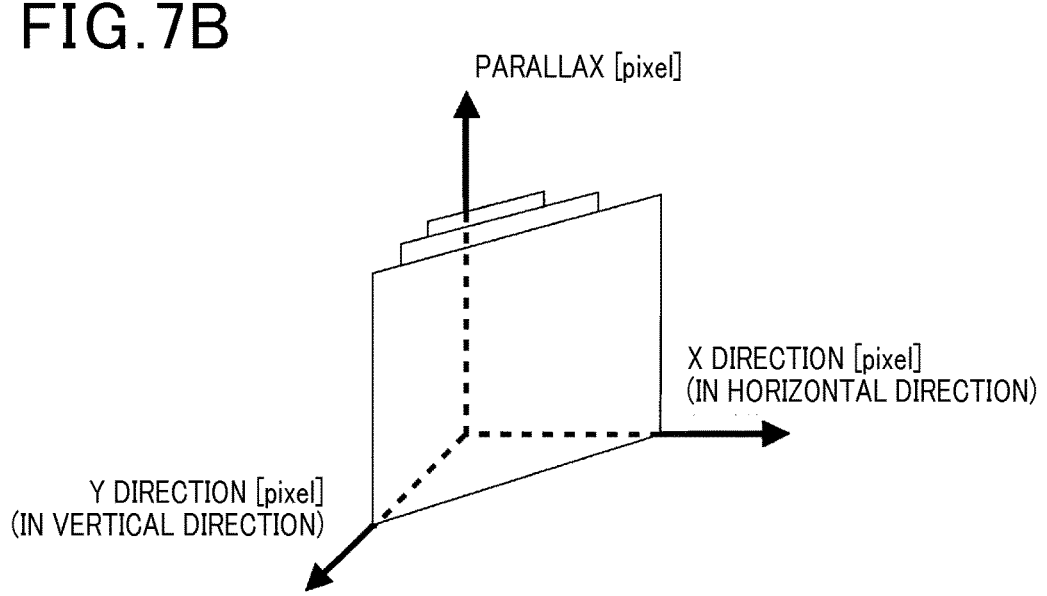

In the process of step S240, a cost Ex-y of the node is calculated by the following procedure.
[Procedure 3-1]
FIG. 7A and FIG. 7B are views explaining the cost calculation process in an oblique direction in the captured image performed by the distance detection device 1 according to the exemplary embodiment.

As shown in FIG. 7B, the processing section 10 prepares a virtual space viewed from the X-Y direction (a right obliquely upward (45°) direction from the left bottom side) in the captured image having the nodes. The processing section 10 selects the pixel corresponding to each node. That is, the processing section 10 selects the pixel in the left column in the reference image, and then selects the pixel in the right obliquely upward 45° direction.

When reaching the distal end pixel in the virtual space, the processing section 10 selects the upper side pixel in the left column, and repeats the above selection process. At this time, the processing section 10 sequentially selects the pixels in the comparative image which corresponds to the selected pixel in the reference image from the left bottom side to the right upper side.

The processing section 10 calculates the parallax cost S(up, uq).
[Procedure 3-2]
The processing section 10 processes the calculated cost D(p, up) of each node and the calculated parallax cost S(up, uq) on the basis of the Viterbi algorithm.

As shown in FIG. 7A, the processing section 10 obtains a combination between the cost of the node and the parallax cost every node so that the E(up) has the minimum value on the basis of the Viterbi algorithm. The obtained data become the cost in the right oblique upward direction.
[Procedure 3-3]
The processing section 10 performs the same [Procedure 3-1] and [Procedure 3-2] previously described in order to obtain the cost in the oblique direction from the upper right side to the left oblique downward direction on the basis of the Viterbi algorithm. The obtained data become the cost in the right oblique downward direction.

[Procedure 3-4]
The processing section 10 adds the cost in the right oblique downward direction obtained by the [Procedure 3-3] and the cost in the right oblique upward direction obtained by the [Procedure 3-2] every corresponding node, and stores the addition result as the cost Ex-y in the right oblique direction into the memory section 12. The operation flow proceeds to step S250.
[Procedure 4]
In the process of step S250, the processing section 10 performs the following procedure in order to obtain the cost Ex+y. In this case, the processing section 10 calculates the cost in the left oblique direction Ex+y by using the same process of the [Procedure 3-1] to [Procedure 3-4], and stores the calculated cost Ex+y into the memory section 12.

It is possible for the processing section 10 to calculate the costs E(p, u), (Ex, Ey, Ex-y, Ex+y) on the basis of the following equation (11) regarding the Viterbi algorithm.

$$E(p,u)=\min_{p=0,\ldots,u}\{E(p-1,v)+s(u,v)\}+D(p,u) \quad (11)$$

where E(p,u) indicates a cost at a parallax u between the pixel position p and the pixel position p−1 on the basis of the Viterbi algorithm, s(u, v) indicates a cost when the parallax v is shifted to the parallax u by switching the pixel position p−1 to the pixel position p, and D(p, u) indicates a cost of the node when the pixel position is p and the parallax is u.

Figure 8:
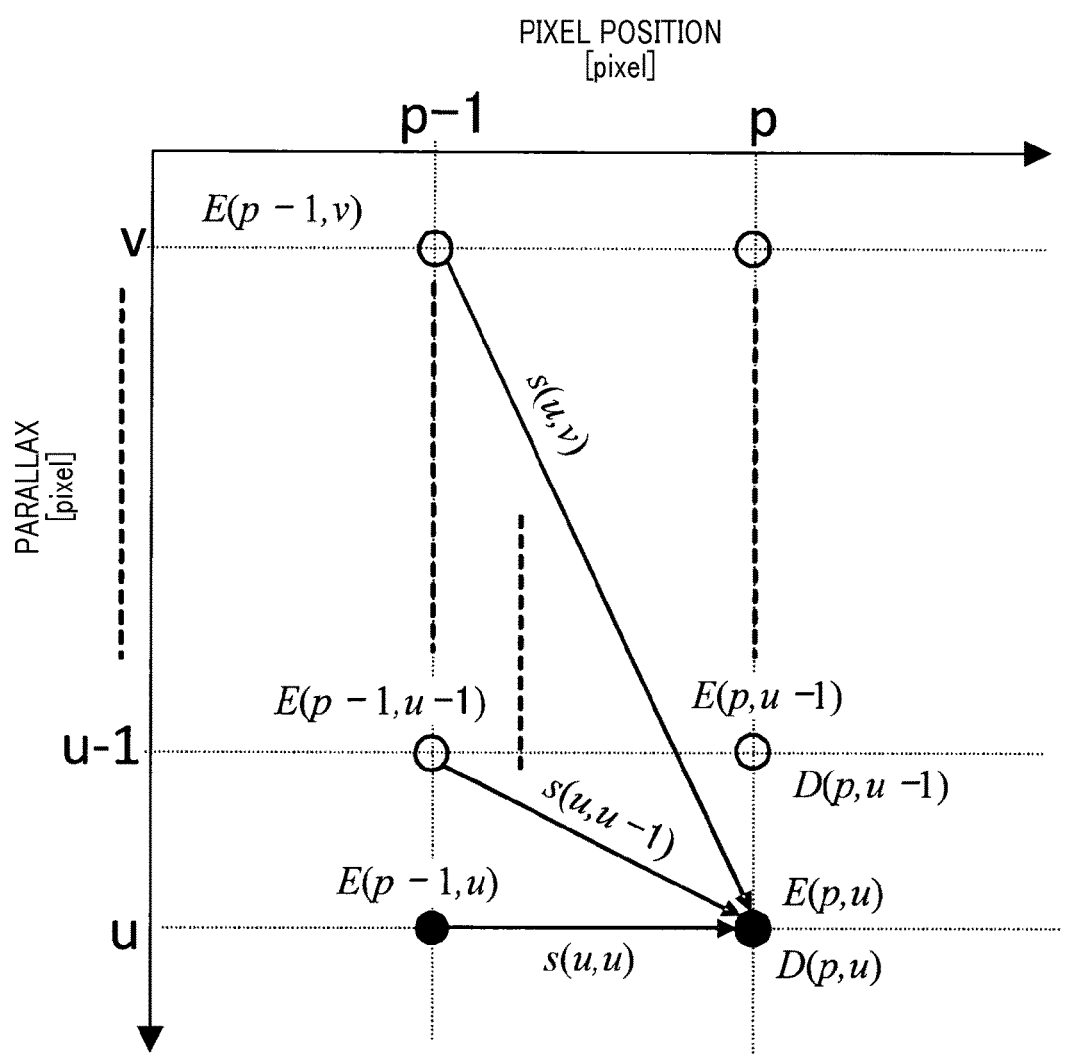
FIG. 8 is a schematic view showing a high-speed cost calculation process performed by the distance detection device according to the exemplary embodiment of the present invention.

FIG. 8 is a schematic view showing a high-speed cost calculation process performed by the distance detection device 1 according to the exemplary embodiment.

For example, FIG. 8 shows an example of calculating the cost on the basis of the Viterbi algorithm when the pixel position p−1 is shifted to the pixel position p in the direction from the left to the right. The cost on the basis of the Viterbi algorithm at the position p and the parallax u is obtained by adding D(p, u) of the own node to the minimum value {E(p−1, v)+s(u, v)} in the passages branched from all of the nodes at the pixel position p−1.

It is necessary for the processing section 10 to perform the searching processes (m×n) times in order for the pixel position p−1 to move the pixel position p when the available parallax range is m, the searching range (the number of arrows shown in FIG. 8) is n.

However, the processing section 10 according to the exemplary embodiment calculates E(p, u) by using the following equation (12).

$$E(p,u)=\min\{(E(p,u-1)-D(p,u-1)+1),(E(p-1,u)+s(a,u))\}+D(p,u) \quad (12)$$

The processing section 10 calculates the optimum solution by using the equation (12) and the cost at the parallax (u−1) and the pixel position p, the cost at the parallax u and the pixel position (p−1) and the cost D(p, u).

The reason why the processing section 10 uses the equation (12) instead of using the equation (11) is that the equation (11) is equivalent to the equation (12). A description will now be given of the equivalence between the equation (11) and the equation (12).

$$E(p,u)=\min_{v=0,\ldots,u-1}\{(E(p-1,v)+s(u,v),(E(p-1,u)+s(u,u))\}+D(p,u) \quad (13)$$

$$E(p,u-1)=\min_{v=0,\ldots,u-1}\{E(p-1,v)+s(u-1,v)\}+D(p,u-1) \quad (14)$$

In the min part of the E(p, u) as the equation (13), the range {v=0, . . . , u−1} is equivalent to the second term at {v=u}. In addition, the equation (14) is equal to the equation

(11) when u=(u−1) as designated by the following equation (15).

$$E(p,i-1)-D(p,u-1)=\min_{v=0,\ldots,u-1}\{E(p-1,v)+s(u-1,v)\} \quad (15)$$

In the equation (15), when D in the right hand side is moved to the left hand side, and −s(u−1, v)+s(u, v) is added to each of the right hand side and the left hand side, it is possible to obtain the following equation (16).

$$E(p,u-1)-D(p,u-1)+s(u,v)-s(u-1,v)= \\ \min_{v=0,\ldots,u-1}\{E(p-1,v)+s(u,v)\} \quad (16)$$

Further, when the left hand side of the equation (16) is replaced with min {E(p−1, v); s(u, v)} in the right hand side of the equation (13), it is possible to represent E(p, u) by the equation (12). That is, it can be understood to calculate E(p, u) by adding the result of the comparison operation of the second term (min part) and the cost D of the node.

The above equations use a relationship of s(u, v)=u−v. As previously described, it is possible for the processing section 10 to calculate the cost E(p, u) by using the equation (12) instead of using the equation (11). This makes it possible for the processing section 10 to perform the searching process 2m times only, not (m×n) times. This makes it possible to increase the processing speed of calculating the distance to the object.

In step S270 shown in FIG. 3, the processing section 10 selects the parallax having the minimum cost on the basis of the cost E(P, u). The operation flow proceeds to step S280.

In step S280, the processing section 10 stores a corresponding relationship of pixels between the reference image and the comparative image. The processing section 10 completes the corresponding point searching process shown in FIG. 3.

After the completion of the corresponding point searching process shown in FIG. 3, the operation flow returns to step S40 in the distance calculation process shown in FIG. 2.

In step S40, the processing section 10 calculates the distance to the target object shown on the pixels on the basis of the parallax of each corresponding pixel. The operation proceeds to step S50.

In step S50, the processing section 10 outputs corresponding data regarding the corresponding relationship between the pixel and the distance to the vehicle control section 30.

Figure 9A:
FIG. 9A is a view showing an example of a scene image.
Figure 9B:
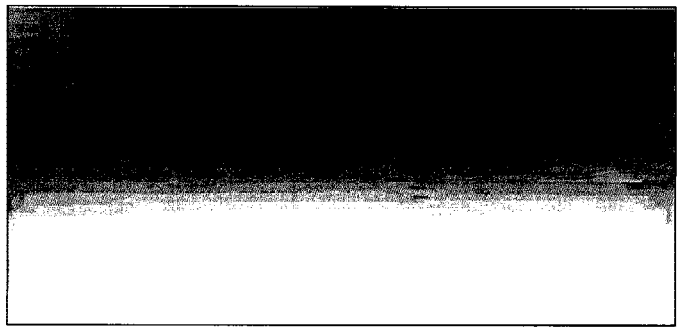
FIG. 9B is a view showing a distance image which corresponds to the scene image shown in FIG. 9A.

FIG. 9A is a view showing an example of a scene image. FIG. 9B is a view showing the distance image which corresponds to the scene image shown in FIG. 9A.

FIG. 9B shows the corresponding data transmitted from the processing section 10 to the vehicle control section 30. That is, the processing section 10 processes the scene image shown in FIG. 9A and generates the distance image as the corresponding data shown in FIG. 9B.

Shading is applied to the distance image shown in FIG. 9B. That is, the more the degree of shading increases, the more the distance to the target object becomes far, i.e. the own vehicle becomes far from the target object. It is clearly recognized from the distance image shown in FIG. 9B for the processing section 10 to detect a correct distance at a middle section on the roadway having less edge component.

However, in a case in which the target object such as a preceding vehicle is relatively far from the own vehicle, there is a possible probability for the processing section 10 to be difficult to correctly detect a distance to the preceding vehicle by noise, etc. In order to avoid this probability, the processing section 10 performs the following process in order to detect a correct distance to the preceding vehicle.

In step S60 shown in FIG. 2, the processing section 10 performs the target object detection process by using voting in the distance calculation process in order to detect the target object.

The target object detection process specifies a coordinate of the target object by using voting, and obtain an attribute of the target object. A description will now be given of the target object detection process in more detail with reference to FIG. 10.

Figure 10:
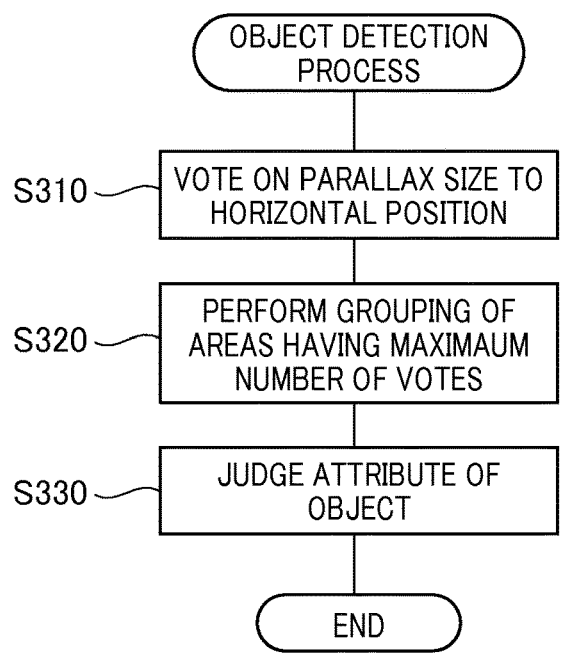
FIG. 10 is a flow chart showing a target object detection process in the distance calculation process performed by the distance detection device according to the exemplary embodiment of the present invention.

FIG. 10 is a flow chart showing the target object detection process in the distance calculation process performed by the processing section 10 in the distance detection device 1 according to the exemplary embodiment.

In step S310 shown in FIG. 10, the processing section 10 votes on a magnitude of the parallax in the horizontal position. The horizontal position indicates a coordinate value in the horizontal direction.

Figure 11:
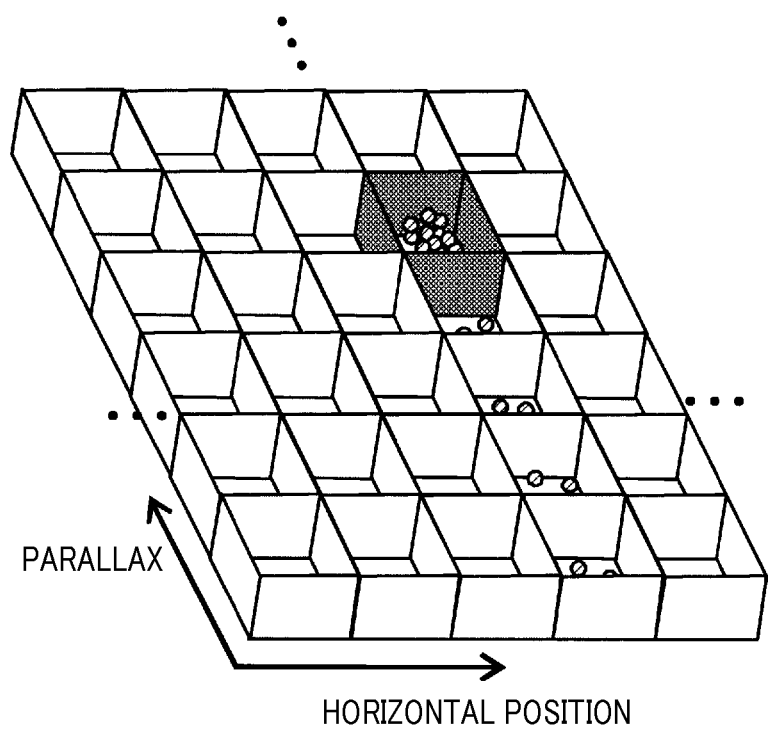
FIG. 11 is a schematic view showing a voting process in the distance calculation process performed by the distance detection device according to the exemplary embodiment of the present invention.

FIG. 11 is a schematic view showing the voting process in the distance calculation process performed by the processing section 10 in distance detection device 1 according to the exemplary embodiment.

As shown in FIG. 11, the processing section 10 generates a virtual space which shows a relationship between a horizontal position (or, a lateral position) of each pixel in the reference image and a parallax of a corresponding point in another image corresponding to each pixel in the reference image. The parallax indicates the number of pixels.

The processing section 10 processes the pixels contained in n columns (for example, 20 columns, where n=20, and n is a natural number) in the reference image, where one column contains pixels from the left side to the right side in the horizontal direction of the reference image. The processing section 10 sequentially processes pixels toward the virtual direction.

The processing section 10 votes on a relationship between a horizontal position (or a lateral position) of each pixel and a corresponding parallax in the virtual space. As shown in FIG. 11, when there is an object (which has a plane in perpendicular to a direction of each of the image capturing sections 21 and 22), the parallax position corresponding to the distance to the object has the maximum number of votes. For this reason, it is possible for the processing section 10 to estimate that the object is present at the position having the maximum number of votes. The operation flow proceeds to step S320 shown in FIG. 10.

In step S320, the processing section 10 performs a grouping process of the areas relatively having the maximum number of votes, for example, which is not less than votes of a predetermined number. In the grouping process, the processing section 10 extracts pixels adjacent to the pixels relatively having the maximum number of votes in the horizontal direction and the vertical direction. The processing section 10 obtain a pixel area including the pixels relatively having the maximum number of votes, and the adjacent pixels adjacently the pixels relatively having the maximum number of votes. The processing section 10 generates a rectangle shaped section which is inscribed to the pixel area. The operation flow proceeds to step S330.

In step S330, the processing section 10 judges the attribute of the object obtained by the grouping process. This attribute of the object indicates a pedestrian, a motorcycle, a vehicle, a large vehicle, etc. The processing section 10 judges the attribute of the target object on the basis of a size of the rectangle shaped section (a position of the rectangle shaped section, a length of the rectangle shaped section, etc.).

After the completion of the processes previously described, the processing section 10 completes the object detection process shown in FIG. 10. The operation flow proceeds to step S70 shown in FIG. 2.

In step S70, the processing section 10 detects a reliability of the detected object. For example, when the cost E of the object is not less than a predetermined value, the processing section 10 judges that the object has a low reliability. On the other hand, when the cost E of the object is not less than the predetermined value, the processing section 10 judges that the object has a high reliability.

When the detection result in step S70 indicates that the object has a high reliability ("YES" in step S70), the operation flow proceeds to step S80. In step S80, the processing section 10 instructs the vehicle control section to perform a follow-up control of the object which has been detected in the frame (the captured image).

On the other hand, when the detection result in step S70 indicates that the object has a low reliability ("NO" in step S70), operation flow proceeds to step S90. In step S90, the processing section 1 uses previously-obtained data, and instructs the vehicle control section not to perform the follow-up control of the object. That is, the processing section 10 uses the previously obtained information of the object having a high reliability in a past frame. The operation flow proceeds to step S110.

In step S110, the processing section compares the number of frames in which the position of the object has been detected with the number of the reference frames. For example, when the number of the reference frames is not less than 20, as a necessary number to correctly estimate the movement of the object, with high accuracy by using the asynchronous stereo method. When the result of step S100 indicates "YES", the operation flow proceeds to step S120. The number of the reference frames has been determined by experiment.

When the comparison result in step S110 indicates that the number of the frames of the object does not reach the number of the reference frames ("NO" in step S110), the operation flow returns to step S10.

On the other hand, when the comparison result in step S110 indicates that the number of the frames of the object is not less than reach the number of the reference frames ("YES" in step S110), the operation flow proceeds to step S120.

In step S120, the processing section 10 selects a representative point of the object. That is, the processing section 10 selects optional number of the points of the object in each frame.

Figure 12:
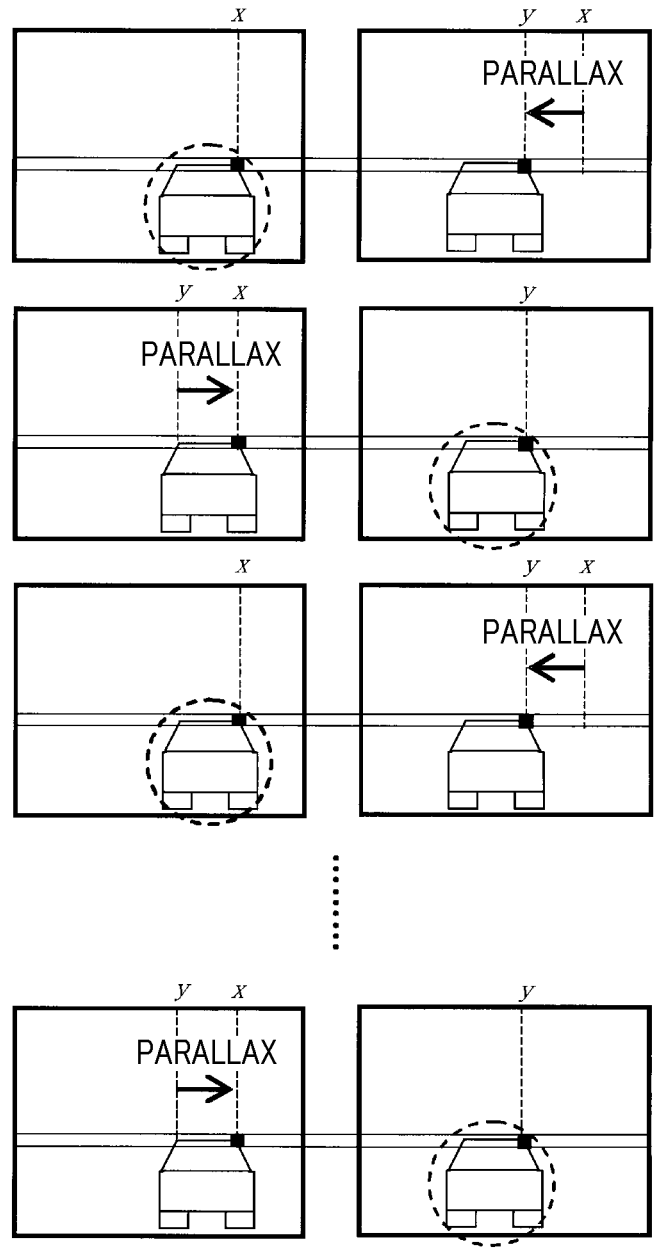
FIG. 12 is a view explaining an image used by an asynchronous stereo method performed by the distance detection device 1 according to the exemplary embodiment of the present invention.

FIG. 12 is a view explaining an image used by the asynchronous stereo method performed by the distance detection device 1 according to the exemplary embodiment.

As shown in FIG. 12, the processing section 10 alternately selects the images obtained by the image capturing sections 21 and 22, and selects the representative points from the selected images. In FIG. 12, the processing section 10 selects the images designated by black circles. When selecting the optional points which become representative points, it is sufficient for the processing section 10 to select a center point of gravity in the object, or one or more center points of light sources of the object, such as tail lamps of the preceding vehicle, or one or more optional points in the object. The operation flow proceeds to step S130.

In step S130, the processing section 10 performs the asynchronous stereo method by using the selected points. The asynchronous stereo method is a known method, for example, which has been disclosed in the patent document, the Japanese patent laid open publication No. JP 2014-020845 as previously explained.

A description will now be given of the asynchronous stereo method performed by the distance detection device 1 according to the exemplary embodiment.

Figure 13:
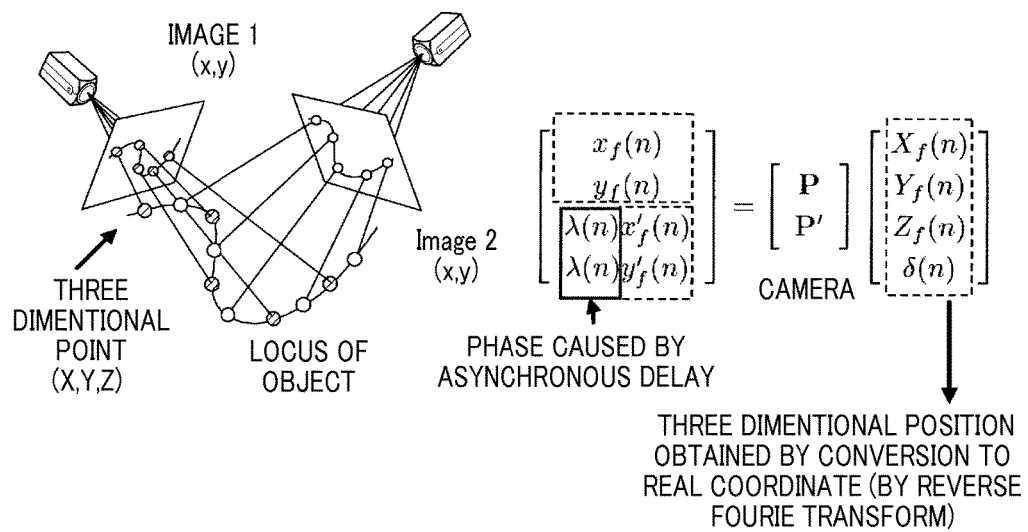
FIG. 13 is a schematic view explaining the asynchronous stereo method performed by the distance detection device according to the exemplary embodiment of the present invention.

FIG. 13 is a schematic view explaining the asynchronous stereo method performed by the distance detection device 1 according to the exemplary embodiment.

As shown in FIG. 13, the processing section 10 obtains a frequency space locus, obtained by performing the Fourier transform, which represents a moving locus of the position of the object expressed in the frequency space. Further, the processing section 10 performs calculates a distance to the object (from the own vehicle) by performing the inverse Fourier transform on the locus in the frequency space. That is, the processing section 10 obtains a locus of the object in a real space on the basis of the locus of the object in the frequency space, and the fact in which the timings of the images captured by the image capturing sections 21 and 22, i.e. the right hand camera and the left hand camera mounted on the own vehicle, are shifted by a predetermined time length and the arrangement of these cameras has been fixed and known.

Because the Fourier transform and the reverse Fourier transform previously described are known, the detailed explanation thereof is omitted here. When obtaining numeral solution of the variables $Xi(n)$, $Yf(n)$ and $Zf(n)$, described in the patent document, the Japanese patent laid open publication No. JP 2014-020845, the processing section 10 eliminates high frequency components from the obtained numeral solution of the variables $Xf(n)$, $Yf(n)$ and $Zf(n)$. The processing section 10 eliminates the high frequency components from these numeral solution of the variables $Xf(n)$, $Yf(n)$ and $Zf(n)$ unless when the object such as the preceding vehicle is running at a very high speed.

Figure 14:
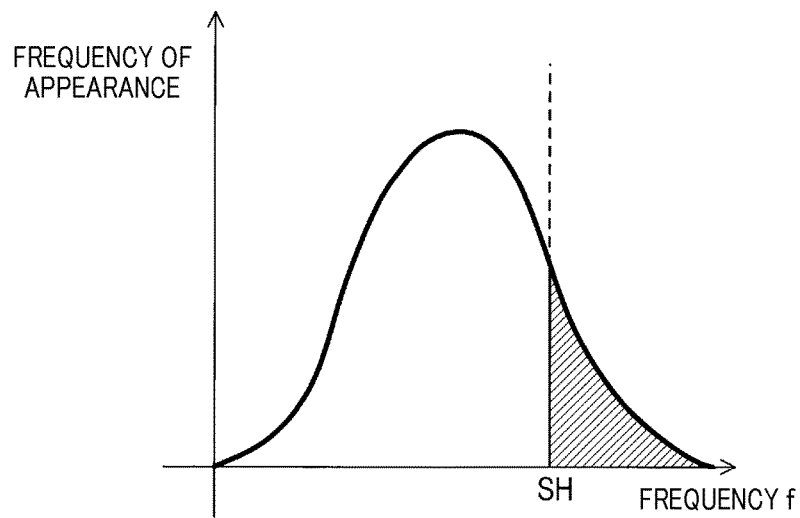
FIG. 14 is a graph showing a relationship between a frequency f and an appearance frequency, which represents a high-frequency area eliminating process performed by the distance detection device according to the exemplary embodiment of the present invention.

FIG. 14 is a graph showing a relationship between a frequency f and an appearance frequency, which represents a high-frequency area eliminating process performed by the distance detection device 1 according to the exemplary embodiment. For example, when obtaining a relationship between the frequency f and the frequency of appearance shown in FIG. 14, the processing section 10 eliminates a high frequency side (which is designated by hatched area) from the relationship between the frequency f and the frequency of appearance. The processing section 10 performs the reverse Fourier transform after the high frequency component has been eliminated from the relationship shown in FIG. 14, as previously described.

The operation flow proceeds to step S140 shown in FIG. 2. In step S140, the processing section 10 outputs the position information of the object such as the preceding vehicle, for example, which drives on the lane of the roadway in front of the own vehicle. The processing section 10 completes the distance calculation process shown in FIG. 2.

[Effects of the Distance Detection Device 1 According to the Exemplary Embodiment]

A description will be given of the effects of the distance detection device 1 according to the exemplary embodiment.

The processing section 10 in the distance detection device 1 according to the exemplary embodiment calculates, for every reference pixel, a pixel cost on the basis of a difference between pixel information of a reference pixel in the reference image and pixel information of a comparative pixel in the comparative image while switching the reference image and the comparative image. The reference image is an image in a plurality of images, and the comparative image is the images other than the reference image.

The processing section 10 calculates, for every reference pixel, a parallax cost which represents a cost regarding a change amount of the parallax, when the reference image being switched. This parallax represents a difference in coordinate, i.e. a coordinate difference between a reference pixel in the reference image and a comparative pixel in the comparative image. The processing section 10 calculates a minimum total cost for a combination of a reference pixel and a comparative pixel when the reference image is switched. This minimum cost represents a sum of the pixel cost and the parallax cost.

The processing section 10 determines a corresponding point between each reference pixel and its corresponding comparative pixel in the comparative image. The processing section 10 extracts an object from each of captured images on the basis of the relationship between each reference pixel and its corresponding comparative point.

The processing section 10 calculates an image coordinate group which represents a coordinate of the object in each of the captured images which form a first captured image group and a second captured image group. The first captured image group consists of a plurality of captured images obtained every reference period. The second captured image group consists of images obtained by shifting the reference period of the captured images by an asynchronous timing.

The processing section 10 calculates a distance of the object in each image coordinate group on the basis of a relationship in which the first captured image group is shifted from the second captured image group by the asynchronous timing.

Accordingly, because the distance detection device 1 according to the exemplary embodiment obtains the corresponding point on the basis of the cost calculation, it is possible for the distance detection device 1 to correctly calculate a distance to the object such as a preceding vehicle with a simple processing and recognize the object with a simple structure. This makes it possible to reduce the processing section 10 of the distance detection device 1 when detecting and calculating the distance to the object.

Further, the processing section 10 calculates a minimum value of a total cost obtained when the reference image and the comparative images in the captured images are switched in order along a plurality of directions. The processing section 10 calculates the minimum value by adding the minimum costs calculated every direction together, or the minimum costs calculated by superimposing the minimum costs every direction.

Because the distance detection device 1 according to the exemplary embodiment calculates the minimum cost in each direction, it is possible to improve the detection accuracy of detecting the distance from the own vehicle to the object such as a preceding vehicle.

Further, the processing section 10 in the distance detection device 1 according to the exemplary embodiment votes on the relationship between the horizontal position of each pixel and the parallax corresponding to this pixel in the virtual space. The virtual space represents the relationship between a horizontal position of each pixel in the reference image and a parallax between each pixel in one image and a corresponding pixel in another image. The processing section 10 estimates that the object is present at a position relatively the maximum number of votes.

Because the distance detection device 1 according to the exemplary embodiment estimates the position of the object detected in the captured images on the basis of the voting process, this makes it possible to detect the position or area of the object with a simple process. Further, the processing section 10 in the distance detection device 1 according to the exemplary embodiment extracts the object from many images which have been captured in time series by the image capturing sections 21 and 22 such as in-vehicle cameras (for example, a right-hand front camera and a left-hand front camera. The processing section 10 starts to perform the distance calculation process when the number of the objects (the number of frames) extracted from the captured images has reached a predetermined reference number.

Because the distance detection device 1 according to the exemplary embodiment having the structure previously described performs the distance calculation process only after the number of the objects extracted from the images has reached to the predetermined reference number, it is possible to output the position of the object only when detecting the distance to the object with high accuracy.

Still further, the processing section 10 in the distance detection device 1 according to the exemplary embodiment obtains the frequency space locus of the object, which represents a moving locus of the position of the object in the frequency space expressed by the Fourier transform, and performs the reverse Fourier transform on the frequency space locus of the object in order to calculate the distance to the object.

Because the distance detection device 1 according to the exemplary embodiment can perform the Fourier transform by using the capturing period of the image capturing sections 21 and 22 which has been determined in advance, it is possible to calculate the distance to the object with high accuracy.

Further, the processing section 10 in the distance detection device 1 according to the exemplary embodiment performs the reverse Fourier transform on the values from which the predetermined high frequency components have been eliminated from the frequency space locus of the object.

It is possible for the distance detection device 1 according to the exemplary embodiment having the structure previously described to eliminate from the captured images noise such as an object which is moving at a very high speed.

Still further, the processing section 10 in the distance detection device 1 according to the exemplary embodiment eliminates abnormal cost values from the object area and estimates the position reliability of the object on the basis of the magnitude of the average cost.

The distance detection device 1 uses the relationship as follows: the more the average cost decreases, the more the detection accuracy increases. It is accordingly possible for the distance detection device 1 to increase the detection accuracy of the position of the object as the detection target such as a preceding vehicle on the basis of the magnitude of the average cost

[Other Modifications]

The concept of the present invention is not limited by the exemplary embodiment previously described in detail. For example, it is possible for the distance detection device 1 according to the present invention to have various modifications.

It is possible to realize the distance detection device 1 according to the present invention by using programs, a computer-readable storage medium, and a method of detecting a distance of the target object. That is, it is possible for the present invention to use a computer-readable storage medium in order to store the programs for executing the functions of the distance detection process. In this case, the distance detection device 1 as a computer system reads the programs stored in the computer-readable storage medium, and executes the program to perform the processes previously described.

The process S60 performed by the processing section 10 corresponds to an object extract section. The processes S70 to S90 performed by the processing section 10 correspond to a position reliability estimation section. The process S120 performed by the processing section 10 corresponds to an image coordinate group acquiring section. The process S130 performed by the processing section 10 corresponds to a distance calculation section.

The process S210 performed by the processing section 10 corresponds to a pixel cost calculation section. The processes S220 to S260 performed by the processing section 10 correspond to a minimum cost pixel calculation section. The process S270 performed by the processing section 10 corresponds to a corresponding point setting section.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A distance detection device capable of detecting a distance to an object in a plurality of images captured by image capturing sections comprising:
    a pixel cost calculation section capable of calculating, for every reference pixel, a pixel cost on the basis of a difference between pixel information of a reference pixel in a reference image and pixel information of a comparative pixel in a comparative image in the captured images of the image acquiring sections while switching the reference image and the comparative image, where the reference image is an image in a plurality of the captured images, and the comparative image is the images other than the reference image;
    a minimum cost pixel calculation section capable of calculating, for every reference pixel, a parallax cost which represents a cost regarding a change amount of the parallax, the parallax representing a coordinate difference between a reference pixel in the reference image and a comparative pixel in the comparative image, and the minimum cost pixel calculation section calculating a minimum total cost for a combination of each reference pixel and each comparative pixel, the minimum total cost representing a sum of the pixel cost and the parallax cost;
    a corresponding point setting section capable of calculating a relationship of a corresponding point between each reference pixel and its corresponding comparative pixel in the comparative image;
    an object extracting section capable of extracting an object from each of the captured images on the basis of the relationship of the corresponding point between each reference pixel and its corresponding comparative point;
    an image coordinate group acquiring section capable of calculating an image coordinate group which represents a coordinate of the object in each of the captured images forming a first captured image group and a second captured image group, the first captured image group comprising a plurality of the captured images obtained every reference period, the second captured image group comprising images obtained by shifting the reference period of the captured images by an asynchronous timing; and
    a distance calculation section capable of calculating a distance to the object in each of the image coordinate group on the basis of a relationship between the first captured image group and the second captured image group in which the first captured image group is shifted from the second captured image group by the asynchronous timing.

2. The distance detection device according to claim 1, wherein the minimum cost pixel calculation section calculates a minimum total cost by changing the reference image and the comparative image in a plurality of directions, wherein the minimum total cost is obtained by adding a minimum cost per direction together or superimposing a minimum cost per direction.

3. The distance detection device according to claim 1, wherein the object extracting section votes on a relationship between a horizontal position of each pixel in the reference image and a parallax of a corresponding point corresponding to each pixel in the comparative image from each pixel of the reference image in a virtual space, and the object extracting section estimates that the object is present at the position having the maximum number of votes, where the virtual space represents the relationship between each pixel in the reference image and the corresponding point corresponding to each pixel.

4. The distance detection device according to claim 2, wherein the object extracting section votes on relationship between a horizontal position of each pixel in the reference image and a parallax of a corresponding point corresponding to each pixel in the comparative image from each pixel of the reference image in a virtual space, and the object extracting section estimates that the object is present at the position having a maximum number of votes, where the virtual space represents the relationship between each pixel in the reference image and the corresponding point corresponding to each pixel.

5. The distance detection device according to claim 1, wherein the pixel cost calculation section, the corresponding point setting section, and the object extracting section perform the process of extracting the object from the images, where these images have been captured in time series, and
    the image coordinate group acquiring section and the distance calculation section calculate the distance to the object after the number of the extracted objects reaches a reference number.

6. The distance detection device according to claim 2, wherein the pixel cost calculation section, the corresponding point setting section, and the object extracting section perform the process of extracting the object from the images, where these images have been captured in time series and
    the image coordinate group acquiring section and the distance calculation section calculate the distance to the object after the number of the extracted objects reaches a reference number.

7. The distance detection device according to claim 1, wherein the distance calculation section obtains a frequency space locus which represents a locus of the position of the object represented by a frequency space obtained by the Fourier transform, and performs a reverse Fourier transform on the frequency space locus in order to obtain the distance to the target object.

8. The distance detection device according to claim 2, wherein the distance calculation section obtains a frequency space locus which represents a locus of the position of the object represented by a frequency space obtained by the Fourier transform, and performs a reverse Fourier transform to the frequency space locus in order to obtain the distance to the target object.

9. The distance detection device according to claim 7, wherein the distance calculation section performs the reverse Fourier transform on values from which a predetermined high frequency component has been eliminated.

10. The distance detection device according to claim 8, wherein the distance calculation section performs the reverse Fourier transform on values from which a predetermined high frequency component has been eliminated.

11. The distance detection device according to claim 1, further comprising a position reliability estimation section capable of estimating a position reliability of the object on the basis of a magnitude of the total cost.

12. The distance detection device according to claim 2, further comprising a position reliability estimation section capable of estimating a position reliability of the object on the basis of a magnitude of the total cost.

* * * * *